US011774029B2

(12) United States Patent
Danneffel et al.

(10) Patent No.: US 11,774,029 B2
(45) Date of Patent: Oct. 3, 2023

(54) OPEN-ENDED PIPE THREAD PROTECTOR WITH SEAL THEREON AND SEAL THEREFOR

(71) Applicant: Universal Moulding Co. Ltd., Port Coquitlam (CA)

(72) Inventors: John Danneffel, Port Coquitlam (CA); Max Danneffel, Port Coquitlam (CA)

(73) Assignee: Universal Moulding Co. Ltd., Port Coquitlam (CA)

(*) Notice: Subject to any disclaimer, the term of this patent is extended or adjusted under 35 U.S.C. 154(b) by 0 days.

(21) Appl. No.: 17/592,393

(22) Filed: Feb. 3, 2022

(65) Prior Publication Data

US 2022/0243855 A1 Aug. 4, 2022

Related U.S. Application Data

(60) Provisional application No. 63/175,424, filed on Apr. 15, 2021, provisional application No. 63/145,766, filed on Feb. 4, 2021.

(51) Int. Cl.
*F16L 57/00* (2006.01)
*F16L 15/00* (2006.01)
(Continued)

(52) U.S. Cl.
CPC ............ *F16L 57/005* (2013.01); *B65D 59/02* (2013.01); *B65D 59/06* (2013.01); *F16L 15/002* (2013.01)

(58) Field of Classification Search
CPC ......... F16L 57/00; F16L 57/06; F16L 57/005; B65D 59/00; B65D 59/02; B65D 59/06
(Continued)

(56) References Cited

U.S. PATENT DOCUMENTS 2,727,651 A 12/1955 Mickelson
2,737,205 A 3/1956 Stringfield
(Continued)

FOREIGN PATENT DOCUMENTS

CN 304046974 S 2/2017
CN 308036085 S 5/2023
(Continued)

OTHER PUBLICATIONS

Tenaris Hydril, Running Manual, IDM Code GDL00337/2, dated Nov. 2016.

*Primary Examiner* — Patrick F Brinson
(74) *Attorney, Agent, or Firm* — Nicholas Garner; Oyen Wiggs Green & Mutala LLP

(57) ABSTRACT

There is provided a pipe thread protector having first and second ends, threading extending from the first end towards the second end thereof, and a bore extending from the first end to the second end thereof. A seal couples to the first end of the pipe thread protector and is tubular. The seal tapers in a direction extending from a proximal end thereof towards a distal end thereof, and tapers in a direction extending from an outer surface thereof to an inner surface thereof.

There is additionally provided a pipe thread protector assembly including a pipe thread protector, a coupling via which the pipe thread protector and a male threaded end of a pipe threadably couple together, and a seal coupled to an inner end of the pipe thread protector. The seal is shaped to protect and extend along an outer end surface of the pipe.

20 Claims, 11 Drawing Sheets

(51) Int. Cl.
*B65D 59/06* (2006.01)
*B65D 59/02* (2006.01)

(58) Field of Classification Search
USPC ....... 138/96 T, 96 R; 285/55, 333, 355, 347, 285/910
See application file for complete search history.

(56) References Cited

U.S. PATENT DOCUMENTS

| | | | |
|---|---|---|---|
| D194,437 S | 1/1963 | Salter | |
| 3,074,579 A | 1/1963 | Miller | |
| 4,020,874 A * | 5/1977 | Palarino | F16L 57/005 |
| | | | 138/96 T |
| 4,036,261 A | 7/1977 | Hauk | |
| 4,139,023 A | 2/1979 | Turley | |
| 4,269,232 A | 5/1981 | Witschi | |
| 4,366,971 A * | 1/1983 | Lula | F16L 58/182 |
| | | | 138/DIG. 6 |
| 4,380,304 A | 4/1983 | Anderson | |
| 4,487,228 A * | 12/1984 | Waldo | B65D 59/06 |
| | | | 411/908 |
| 4,549,337 A * | 10/1985 | Newell | B29C 70/78 |
| | | | 264/552 |
| D281,350 S | 11/1985 | Heier | |
| 4,553,567 A | 11/1985 | Telander | |
| 4,796,668 A * | 1/1989 | Depret | F16L 57/005 |
| | | | 138/96 T |
| 5,195,562 A * | 3/1993 | Dreyfuss | B65D 59/06 |
| | | | 138/96 T |
| D402,354 S | 12/1998 | Strong et al. | |
| 6,085,478 A | 7/2000 | Workman | |
| 6,196,270 B1 | 3/2001 | Richards et al. | |
| 6,367,508 B1 | 4/2002 | Richards et al. | |
| 7,284,770 B2 | 10/2007 | Dell'erba | |
| 7,404,419 B2 | 7/2008 | Pajaro Gonzalez et al. | |
| 7,469,721 B2 | 12/2008 | Takano | |
| D613,827 S | 4/2010 | Damaske et al. | |
| D678,923 S | 3/2013 | Stolz et al. | |
| D762,825 S | 8/2016 | Walker et al. | |
| 9,523,458 B2 | 12/2016 | Yamamoto et al. | |
| D784,497 S | 4/2017 | Vaz et al. | |
| D788,886 S | 6/2017 | Salzer | |
| 9,828,150 B2 | 11/2017 | Danneffel et al. | |
| 10,274,123 B2 | 4/2019 | Danneffel et al. | |
| D899,239 S | 10/2020 | Schatzl | |
| 10,954,045 B2 | 3/2021 | Knight et al. | |
| D921,852 S | 6/2021 | Ball et al. | |
| D932,596 S | 10/2021 | Melaccio | |
| D933,788 S | 10/2021 | Banks | |
| D956,522 S | 7/2022 | Smith | |
| 2004/0200525 A1 | 10/2004 | Goodson et al. | |
| 2004/0201131 A1 | 10/2004 | Goodson et al. | |
| 2005/0045240 A1 * | 3/2005 | Casteran | F16L 57/005 |
| | | | 138/96 T |
| 2006/0042709 A1 | 3/2006 | Takano | |
| 2006/0266428 A1 | 11/2006 | Pajaro Gonzalez et al. | |
| 2007/0113910 A1 | 5/2007 | Pagura et al. | |
| 2008/0092977 A1 | 4/2008 | Zeyfang | |
| 2008/0190509 A1 | 8/2008 | Cox | |
| 2011/0148103 A1 | 6/2011 | Courtois et al. | |
| 2011/0265904 A1 | 11/2011 | Baker et al. | |
| 2012/0076613 A1 | 3/2012 | Ishida | |
| 2013/0105028 A1 | 5/2013 | Lockard et al. | |
| 2013/0213516 A1 | 8/2013 | Clem et al. | |
| 2013/0299037 A1 | 11/2013 | Drouin et al. | |
| 2014/0261849 A1 | 9/2014 | Danneffel et al. | |
| 2016/0312544 A1 | 10/2016 | Whitefield et al. | |
| 2019/0375564 A1 | 12/2019 | Knight et al. | |
| 2021/0199232 A1 | 7/2021 | Egger et al. | |
| 2021/0296869 A1 | 9/2021 | Smith | |
| 2023/0003332 A1 | 1/2023 | Egger et al. | |

FOREIGN PATENT DOCUMENTS

| | | |
|---|---|---|
| JP | D1661385 | 6/2020 |
| KR | 300767531.0000 | 10/2014 |
| KR | 301076716.0000 | 10/2020 |
| KR | 301155709.0000 | 3/2022 |
| RU | 171254 U1 | 5/2017 |

* cited by examiner

OPEN-ENDED PIPE THREAD PROTECTOR WITH SEAL THEREON AND SEAL THEREFOR

CROSS REFERENCE TO RELATED APPLICATIONS

This application is a non-provisional of U.S. Provisional Patent Application No. 63/145,766 filed in the United States Patent and Trademark Office on 4 Feb. 2021, the disclosure of which is incorporated herein by reference and priority to which is claimed. This application further claims priority to U.S. Provisional Patent Application No. 63/175,424 filed in the United States Patent and Trademark Office on 15 Apr. 2021, the disclosure of which is also incorporated herein by reference.

BACKGROUND OF THE INVENTION

Field of the Invention

There is provided a pipe thread protector. In particular, there is provided an open-ended pipe thread protector with a seal thereon, and a seal therefor.

Description of the Related Art

Oil drillers may require down-hole oil pipes to be "drifted" prior to going into the ground. Drifting the pipe is a process of pulling a drift mandrel through the inside length of a pipe to ensure the inside is clear of debris and within a required tolerance. This process ensures that smaller pipes, tools, and other items can be passed through the pipe during use. Drifting is typically performed at the rig-site, prior to the pipes going into the ground.

Currently, thread protectors on both ends of the pipe are removed prior to running a drift mandrel through the length of the pipe. After the pipe thread protectors have been removed, the pipe is left fully exposed, and a drift mandrel may thereafter be pulled through the inner length of the pipe. As the drift mandrel runs through the pipe, the drift mandrel may drag dirt and debris along with it. Such contaminants may fall onto the exposed female and male threads and stick thereon because these threads are coated with a heavy protective grease or pipe dope. After the drifting process is complete, any contaminated pipe dope will need to be removed and reapplied to the threads. The pipe thread protectors are thereafter coupled to the ends of the pipe once more.

In view of the above, there may be a need for a pipe thread protector that can stay on the pipe during the drifting process and keep the threads sealed to inhibit contamination thereof.

BRIEF SUMMARY OF INVENTION

There is provided, and it is an object to provide, an improved pipe thread protector, and seal therefor.

There is accordingly provided a pipe thread protector. The pipe thread protector includes a tubular body. The tubular body of the pipe thread protector has an open first end and an open second end spaced-apart from the first end thereof. The tubular body of the pipe thread protector has a bore extending from the first end thereof to the second end thereof. The pipe thread protector includes threading extending from the first end of the tubular body of the pipe thread protector towards the second end of the tubular body of the pipe thread protector.

According to another aspect, the above pipe thread protector includes a seal coupled to the first end of the tubular body. The seal is shaped to protect and extend along an outer end surface of a pipe.

There is further provided a pipe thread protector seal for a pipe thread protector. The seal is tubular. The seal tapers in a direction extending from a proximal end thereof towards a distal end thereof. The seal tapers in a direction extending from an outer surface thereof to an inner surface thereof.

There is also provided a pipe thread protector seal for a pipe thread protector according to another aspect. The seal is tubular and L-shaped in longitudinal cross-section. The seal tapers in a direction extending from an outer surface thereof to an inner surface thereof.

There is further provided a pipe thread protector according to yet another aspect. The pipe thread protector includes a tubular body having a pair of spaced-apart open ends. The pipe thread protector includes threading extending between the open ends of the tubular body. The pipe thread protector includes a seal coupled to one of the ends of the tubular body. The seal is shaped to inhibit inward bulging thereof when axially compressed.

According to one aspect, a coupling further threadably couples together with the pipe thread protector and a male threaded end of a pipe, with the seal being shaped to cover an end surface of the pipe when the coupling so couples together the pipe thread protector and the male threaded end of the pipe.

There is additionally provided a pipe thread protector assembly. The pipe thread protector assembly includes a pipe thread protector. The pipe thread protector assembly includes a coupling via which the pipe thread protector and a male threaded end of a pipe threadably couple together. The pipe thread protector assembly includes a seal coupled to an inner end of the pipe thread protector. The seal is shaped to protect an outer end surface of the pipe.

According to a further aspect, the seal functions to abut against the outer end surface of the pipe throughout a make-up tolerance range, where the make-up tolerance is an allowable distance range within which a male threaded end portion of the pipe travels into the coupling.

It is emphasized that the invention relates to all combinations of the above features, even if these are recited in different claims.

Further aspects and example embodiments are illustrated in the accompanying drawings and/or described in the following description.

BRIEF DESCRIPTION OF DRAWINGS

The accompanying drawings illustrate non-limiting example embodiments of the invention.

DESCRIPTION OF THE PREFERRED EMBODIMENTS

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 9:
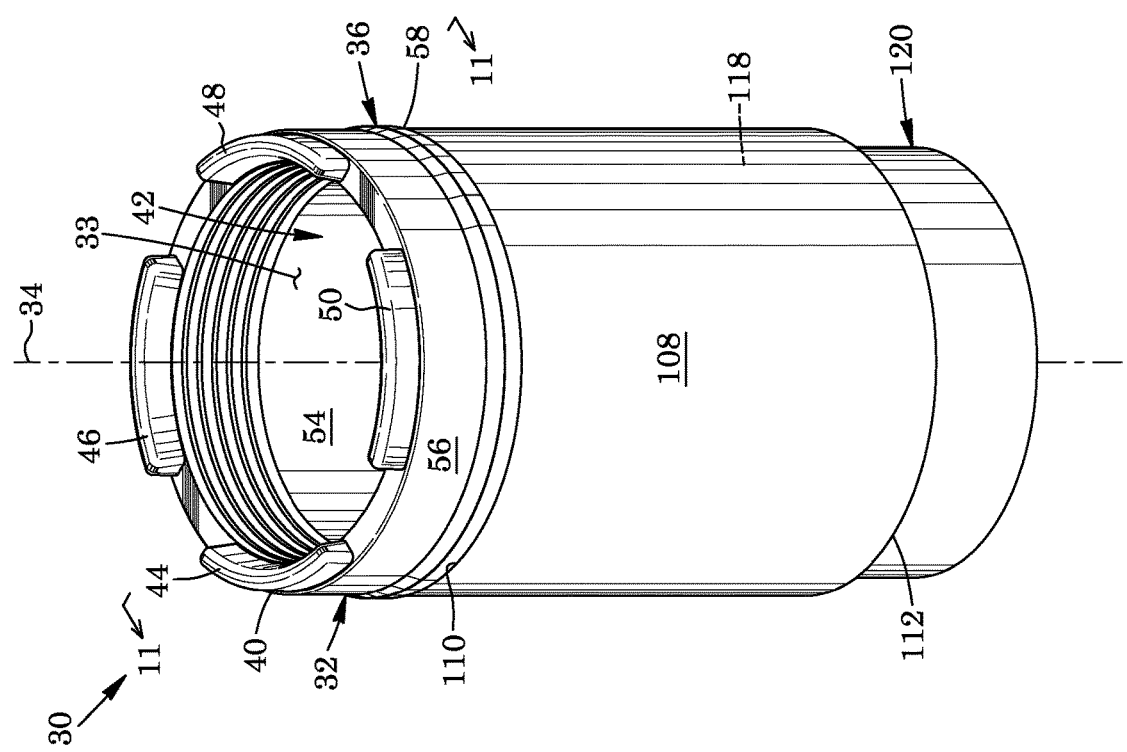
FIG. 9 is an outer end, side perspective view of a pipe thread protector assembly comprising the pipe thread protector of FIG. 1 and a coupling to which the pipe thread protector threadably couples, as well as an end portion of a pipe to which the coupling threadably couples, with the pipe being shown in fragment.

Referring to the drawings and first to FIG. 9, there is shown a pipe thread protector assembly 30.

Figure 2:
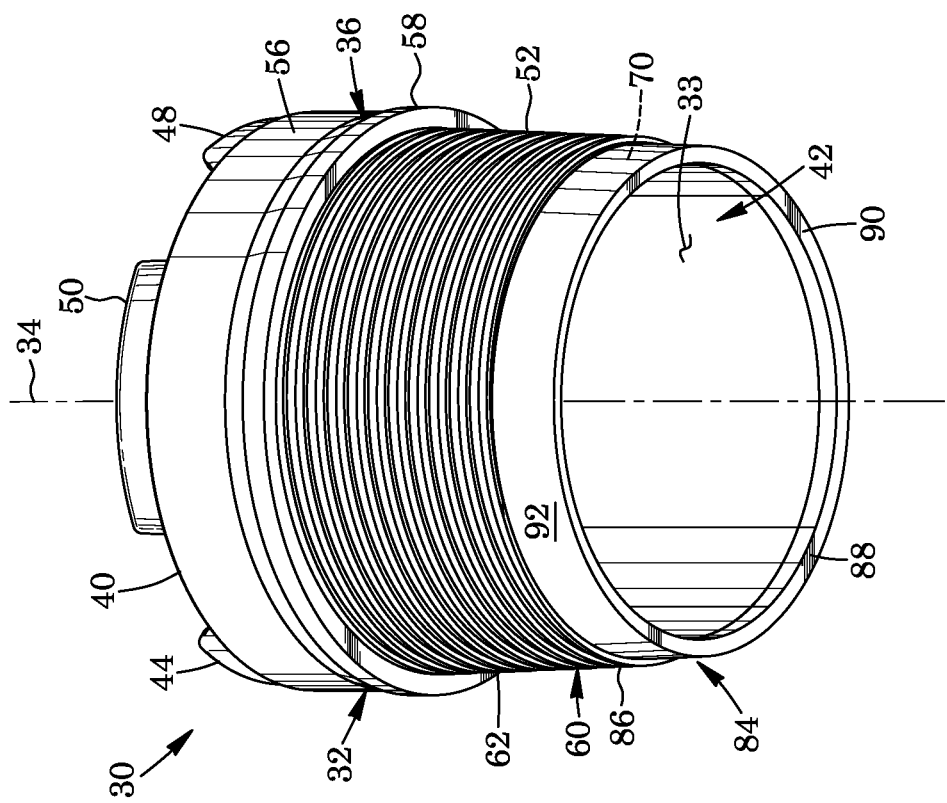
FIG. 2 is an inner end, side perspective view of the pipe thread protector thereof.
Figure 1:
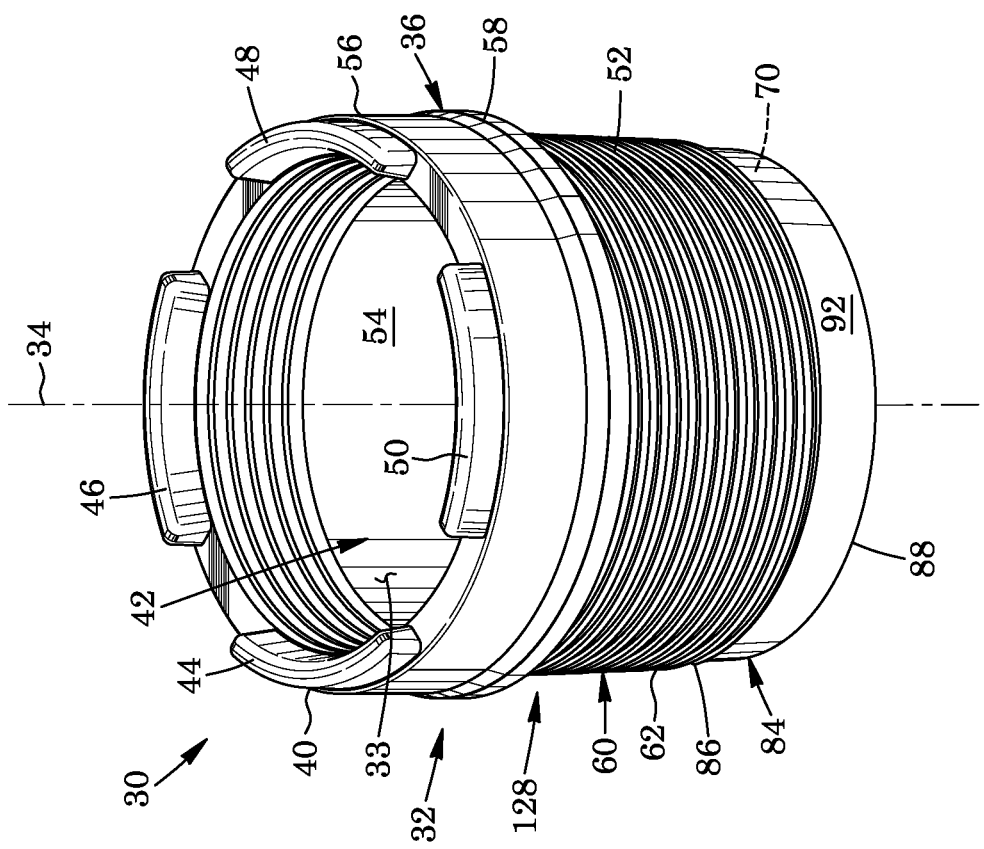
FIG. 1 is an outer end, side perspective view of a pipe thread protector according to one aspect, the pipe thread protector including a tubular body and a seal coupled thereto.
Figure 4:
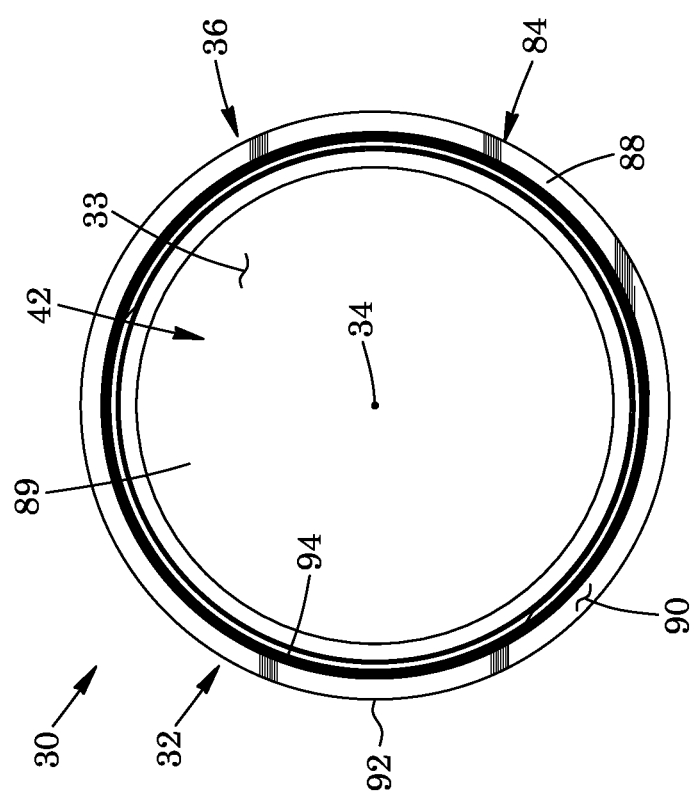
FIG. 4 is an inner end plan view of the pipe thread protector thereof.
Figure 3:
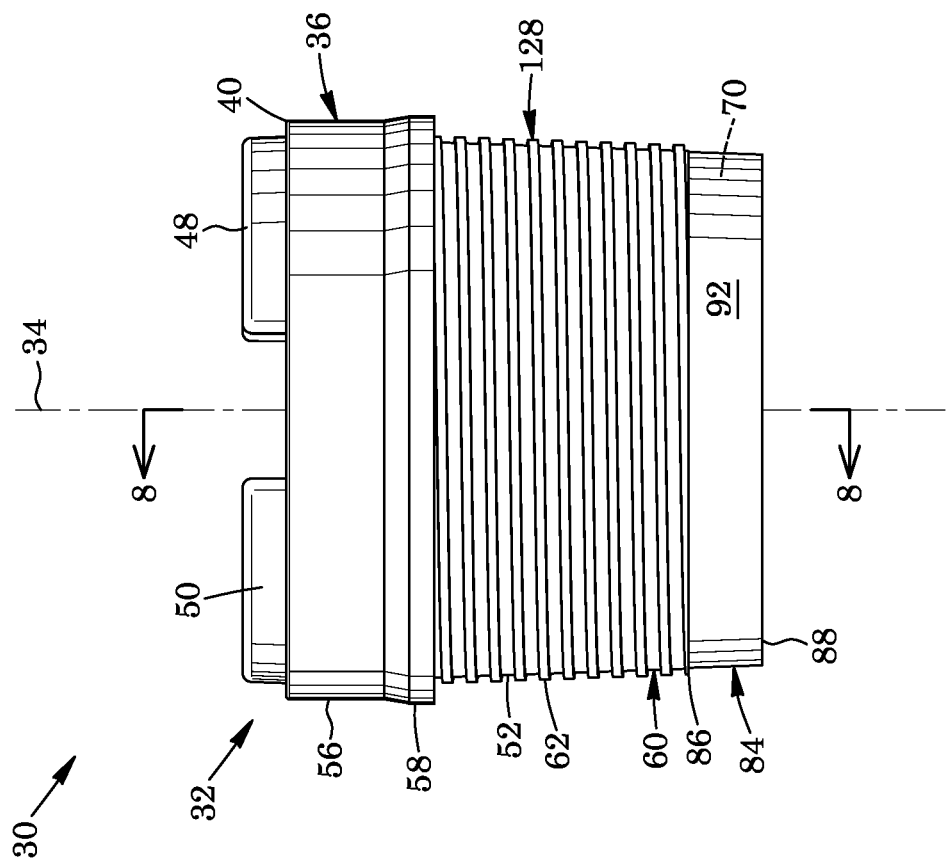
FIG. 3 is a side elevation view of the pipe thread protector thereof.

The pipe thread protector assembly includes a pipe thread protector 32 best seen in FIG. 1. The pipe thread protector has a longitudinal axis 34 and extends about an interior 33. Pipe thread protector 32 includes a tubular body 36 which is coaxial with and which extends along the longitudinal axis. The tubular body of the pipe thread protector is made of a polymer that is at least semi-rigid, in this example comprising a thermoplastic. However, this is not strictly required and tubular body 36 of pipe thread protector 32 may be made of other rigid or semi-rigid materials in other examples.

Figure 8:
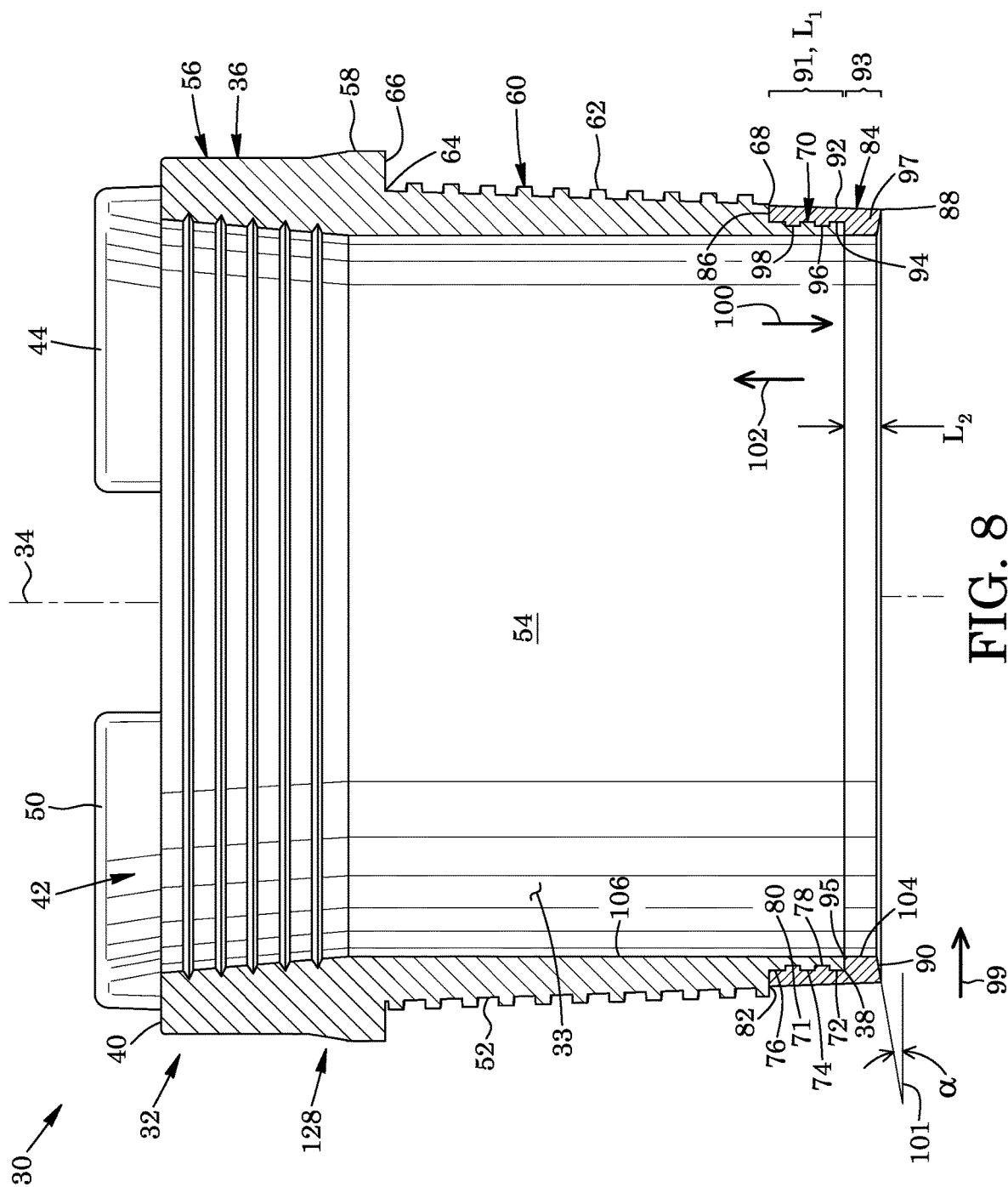
FIG. 8 is a sectional view taken along lines 8-8 of the pipe thread protector of FIG. 3.
Figure 10:
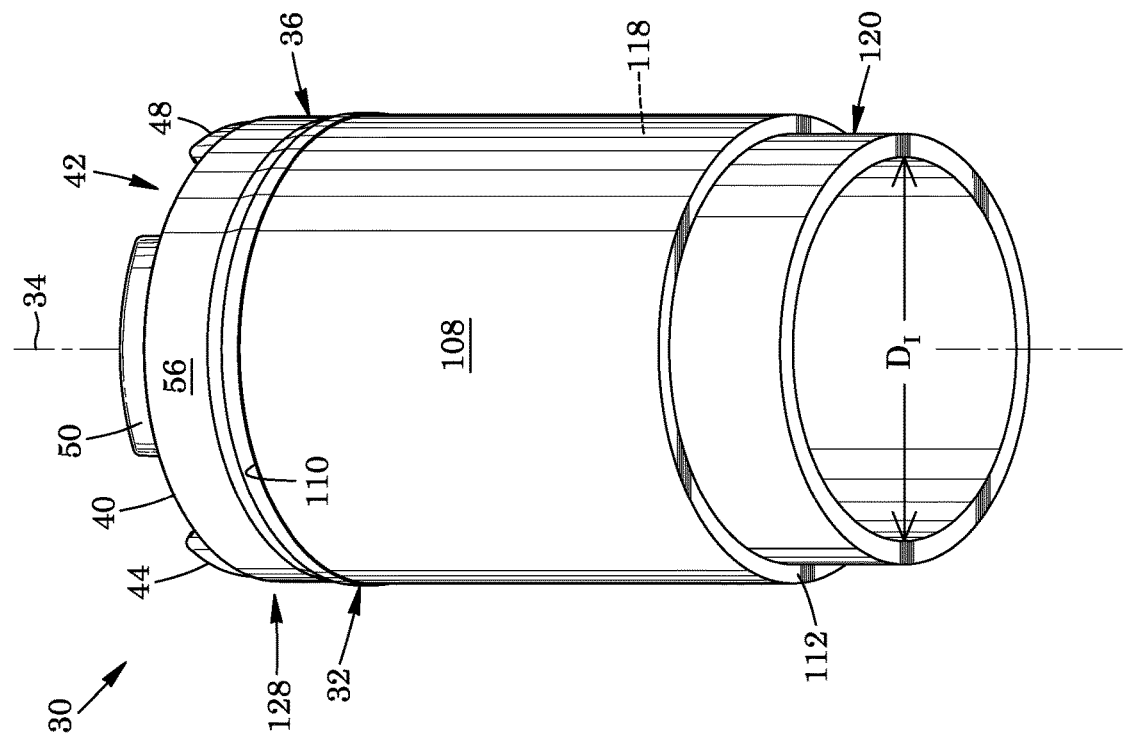
FIG. 10 is an inner end, side perspective view of the pipe thread protector assembly of FIG. 9 together with the end portion of the pipe shown in FIG. 9, with the pipe being shown in fragment.

As seen in FIG. 8, the tubular body of the pipe thread protector has an open first or inner end 38, and an open second or outer end 40 longitudinally spaced-apart from the inner end thereof. Tubular body 36 of pipe thread protector 32 has a bore 42 coaxial with and which extends about axis 34. The bore extends from inner end 38 of the tubular body of the pipe thread protector to outer end 40 of the tubular body of the pipe thread protector. Interior 33 and bore 42 of tubular body 36 are in fluid communication with open ends 38 and 40 thereof.

As seen in FIG. 1, pipe thread protector 32 includes one or more protrusions, in this example a plurality of circumferentially spaced-apart bumpers 44, 46, 48 and 50. The bumpers couple to and extend axially outwards from outer end 40 of tubular body 36 of the pipe thread protector. Each bumper 44, 46, 48 and 50 is a curved rectangular prism in shape in this example: arc-shaped in lateral cross-section and approximately rectangular in longitudinal cross-section.

Referring to FIG. 8, tubular body 36 of pipe thread protector 32 has an outer surface 52. The tubular body of the pipe thread protector also has an inner surface 54 spaced radially inwards from the outer surface. The inner and outer surfaces are annular in this example and extend from near inner end 38 of tubular body 36 of pipe thread protector 32 towards outer end 40 of the tubular body. The tubular body of the pipe thread protector includes a first or distal sleeve portion 56 that extends from outer end 40 thereof towards inner end 38 thereof. The distal sleeve portion of tubular body 36 of pipe thread protector 32 terminates in an outwardly flared end 58 in this example.

The tubular body of the pipe thread protector further includes a second, intermediate or threaded portion 60 coupled to and extending axially from distal sleeve portion 56 thereof. The threaded portion of tubular body 36 of pipe thread protector 32 is integrally formed with the distal sleeve portion of the tubular body of the pipe thread protector in this example. Threading 62 couples to, extends along and extends outwards from outer surface 52 of threaded portion 60 of the tubular body of pipe thread protector 32. The threading thus extends from near inner end 38 of tubular body 36 towards outer end 40 of the tubular body of the pipe thread protector.

Threaded portion 60 of the tubular body of pipe thread protector 32 has a first or outer end 64 radially inwardly spaced-apart from and adjacent flared end 58 of distal sleeve portion 56 of the tubular body of the pipe thread protector. The threaded portion of tubular body 36 of the pipe thread protector couples to distal sleeve portion 56 of the tubular body of the pipe thread protector via outer end 64 of the threaded portion of the tubular body of the pipe thread protector. The tubular body of pipe thread protector 32 has a first shoulder 66 that extends radially between outer end 64 of threaded portion 60 thereof and flared end 58 of distal sleeve portion 56 thereof in this example. The threaded portion of tubular body 36 of the pipe thread protector has a second or inner end 68 longitudinally spaced-apart from the outer end thereof. Threaded portion 60 of the tubular body of the pipe thread protector tapers in a direction extending from outer end 64 thereof to inner end 68 thereof.

Figure 5:
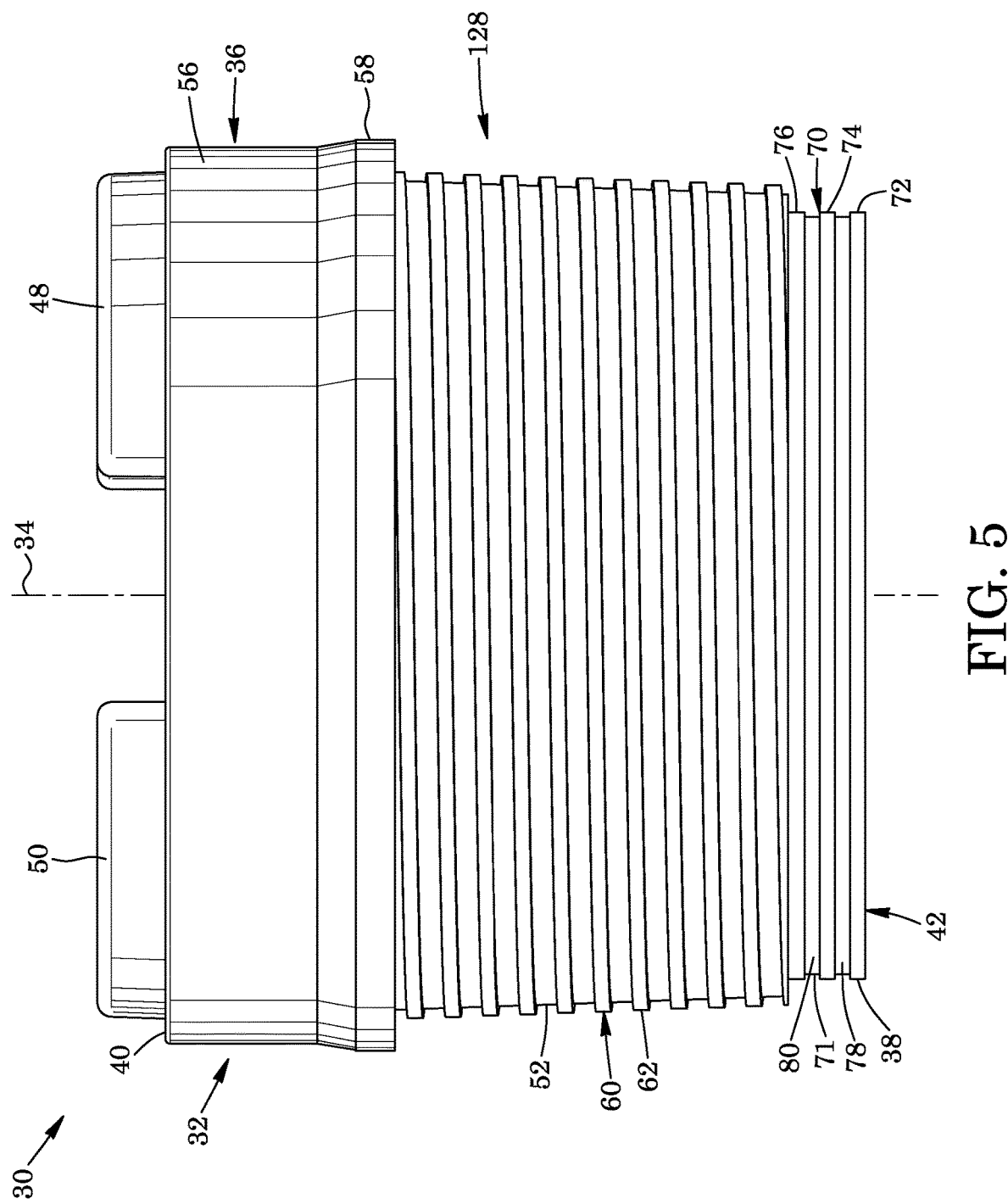
FIG. 5 is a side elevation view of the tubular body of the pipe thread protector of FIG. 3, with the seal thereof being removed and not shown.

As seen in FIG. 5, tubular body 36 of pipe thread protector 32 further includes a third or end portion 70 coupled to and extending axially outwards from the inner end of threaded portion 60 thereof. The end portion of the tubular body of the pipe thread protector extends from inner end 38 of the tubular body towards outer end 40 of the tubular body of the pipe thread protector. As seen in FIG. 8, end portion 70 of the tubular body of pipe thread protector 32 includes one or more protuberances, in this example longitudinally spaced-apart annular tongues 72, 74 and 76. The tongues are rectangular in lateral section in this example and have exterior surfaces 71. The exterior surfaces are annular in this example.

End portion 70 of tubular body 36 of pipe thread protector 32 has a plurality of longitudinally spaced-apart annular grooves 78 and 80. The grooves extend radially inwards from exterior surfaces 71 of and are interposed between respective ones of tongues 72, 74 and 76 in this example. Tubular body 36 of pipe thread protector 32 has a second shoulder 82 that extends radially between tongue 76 and inner end 68 of threaded portion 60 of the tubular body of the pipe thread protector. Referring back to FIG. 5, end portion 70 of tubular body 36 of pipe thread protector 32 is radially inwardly spaced-apart from threaded portion 60 of the tubular body of the pipe thread protector. The end portion of the tubular body of the pipe thread protector is coaxial with and extends parallel to longitudinal axis 34 of the tubular body of the pipe thread protector in this example.

Figure 6:
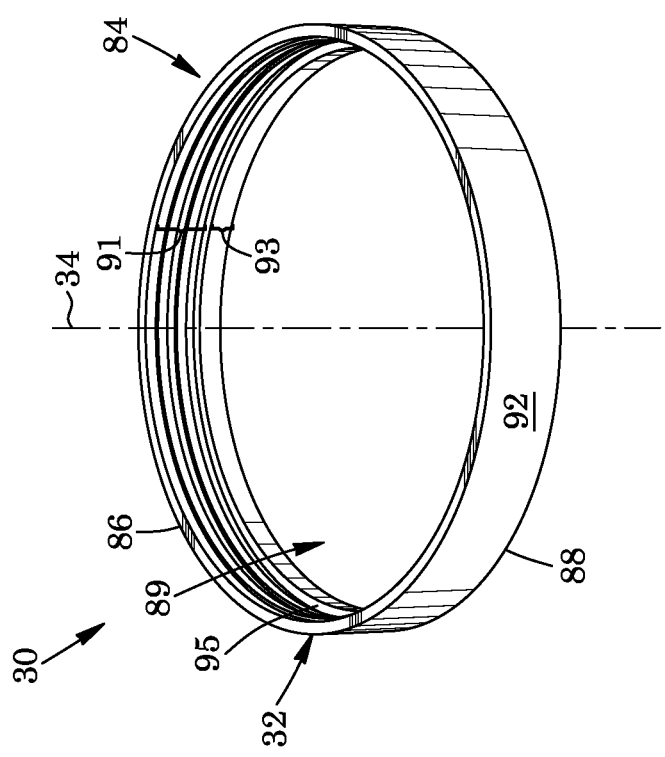
FIG. 6 is a proximal end, side perspective view of the seal of the pipe thread protector of FIG. 1, with the tubular body of the pipe thread protector being removed and not shown.

Referring to FIG. 6, pipe thread protector assembly 30 includes a pipe thread protector seal 84. The seal is made of a different material than tubular body 36 of pipe thread protector 32. Seal 84 is softer and more resilient than the tubular body of the pipe thread protector and in this example is made of an elastomer. However, this is not strictly required and the seal may be made of other resilient and waterproof materials in other embodiments.

Seal 84 is tubular in this example and L-shaped in longitudinal cross-section as seen in FIG. 8. Referring back to FIG. 6, the seal has an annular first or proximal end 86 and an annular second or distal end 88 spaced-apart from the proximal end thereof. The seal has a bore 89 that extends from the proximal end thereof to the distal end thereof.

As seen in FIG. 8, seal 84 includes a first or proximal sleeve portion 91 that is tubular and longitudinally-extending. The proximal sleeve portion of the seal has a longitudinally-extending length L1 that extends from proximal end 86 of seal 84 towards distal end 88 of the seal. The proximal sleeve portion 91 of the seal tapers from the proximal end of the seal towards the distal end of the seal.

Seal 84 includes a second or distal sleeve portion 93 that is tubular and which extends both longitudinally and radially-inwards relative to proximal sleeve portion 91 thereof. The distal sleeve portion of the seal extends from distal end 88 of the sleeve towards proximal end 86 of the sleeve. Distal sleeve portion 93 of seal 84 extends from inner end 38 of tubular body 36 of pipe thread protector 32 to distal end 88 of the seal. The distal sleeve portion of the seal has a maximum, expanded or non-compressed longitudinally-extending length L2 seen in FIG. 8. Proximal sleeve portion 91 and distal sleeve portion 93 of seal 84 are integrally interconnected so as to form a unitary whole in this example.

The distal sleeve portion of the seal is an irregular quadrilateral in cross-section in this example; however, this is not strictly required. Distal sleeve portion 93 of seal 84 extends radially inwards relative to proximal sleeve portion 91 of the seal and towards longitudinal axis 34 of tubular body 36 of pipe thread protector 32. The seal has a shoulder 95 which extends radially and which is interposed between proximal end 86 thereof and distal end 88 thereof. The shoulder of seal 84 is interposed between distal sleeve portion 93 thereof and proximal sleeve portion 91 thereof. The seal so shaped may be referred to as tubular with an inwardly-extending ledge or end flange adjacent a distal end portion thereof.

Figure 7:
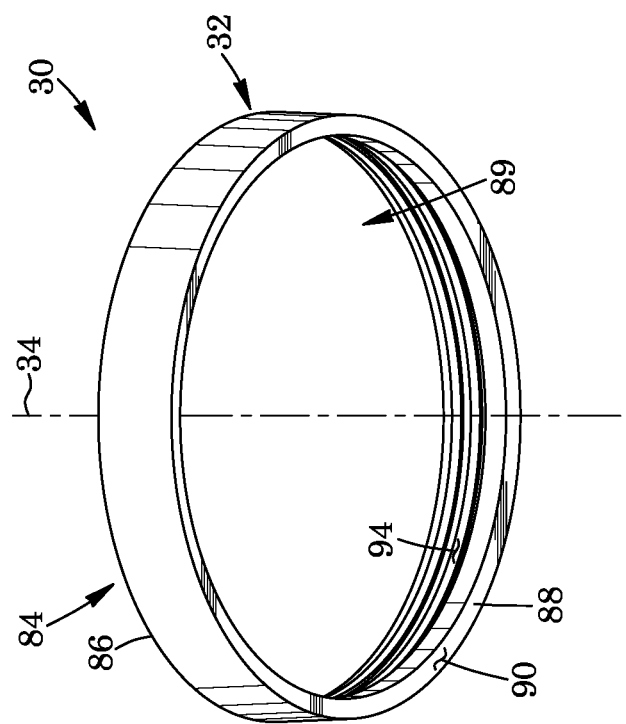
FIG. 7 is a distal end, side perspective view of the seal of FIG. 6.

As seen in FIG. 7, seal 84 has an end surface 90 located at distal end 88 thereof and extends about longitudinal axis 34. The seal is planar in this example. As seen in FIG. 8, end surface 90 of seal 84 is slanted relative to longitudinal axis 34 in this example. The seal has an outer surface 92 and an inner surface 94 spaced radially-inwards from the inner surface thereof. The outer and inner surfaces of seal 84 are annular in this example. Outer surface 92 of the seal extends from proximal end 86 of the seal to distal end 88 of the seal. Inner surface 94 of seal 84 extends from the proximal end of seal 84 towards the distal end of the seal.

End surface 90 of the seal radially and axially extends from outer surface 92 of the seal to inner surface 94 of the seal at an angle α relative to lateral axis 101. The end surface slants from the outer surface towards interior 33 at angle α relative to the lateral axis. Angle α is acute in this example. Seal 84 tapers in a radially inwardly-extending direction 99 which extends from the outer surface thereof to the inner surface thereof. End surface 90 of the seal slants radially inwards and towards interior 33 of tubular body 36 of pipe thread protector 32. Still referring to FIG. 8, the seal includes an outer peripheral edge portion 97 located adjacent to where distal end 88, outer surface 92 and end surface 90 of the seal come together. The outer peripheral edge portion is annular and triangular in longitudinal cross-section in this example.

As seen in FIG. 8, proximal sleeve portion 91 of seal 84 couples to inner end 38 and end portion 70 of tubular body 36 of pipe thread protector 32. Distal sleeve portion 93 of the seal extends from proximal end 86 of the seal to inner end 38 of tubular body 36 of pipe thread protector 32. Seal 84 thus extends in part from the inner end of the tubular body of the pipe thread protector towards outer end 40 of the tubular body of the pipe thread protector. Shoulder 95 of the seal is configured to receive, abut and extend along inner end 38 of tubular body 36 of pipe thread protector 32. The shoulder of seal 84 is shaped to inhibit water and debris from contacting the inner end of the tubular body of the pipe thread protector, in this example by being coextensive with and/or greater in lateral cross-sectional area compared to that of the inner end of the tubular body of the pipe thread protector.

The seal in this example couples to tubular body 36 of pipe thread protector 32 via one or more tongues and grooves: the seal in this example includes at least one, and in this case a pair of longitudinally spaced-apart, radially inwardly extending protrusions or annular tongues 96 and 98. The tongues are rectangular in lateral section, though this is not strictly required. Tongues 96 and 98 couple to and extend radially inwards from inner surface 94 of seal 84. The tongues are shaped to selectively and snugly fit within corresponding annular grooves 78 and 80 of tubular body 36 of pipe thread protector 32.

Still referring to FIG. 8, outer surface 92 of seal 84 aligns with and extends parallel to outer surface 52 of tubular body 36 of pipe thread protector 32 in this example. Distal sleeve portion 93 of seal 84 has an inner surface 104 that is annular and in fluid communication with bore 42 of the tubular body of the pipe thread protector. The inner surface of the distal sleeve portion of the seal aligns with and extends parallel to inner surface 106 of threaded portion 60 of tubular body 36 of pipe thread protector 32. Inner surface 104 of distal sleeve portion 93 of seal 84 flares outwards in a longitudinal direction extending from proximal end 86 of the sleeve towards distal end of the sleeve thereof in this example.

Seal 84, including distal sleeve portion 93 thereof, tapers in a direction 100 extending from outer end 40 of the tubular body of the pipe thread protector towards inner end 38 of the tubular body of the pipe thread protector. The seal, including outer surface 92 thereof, thus tapers in the direction extending from proximal end 86 thereof towards distal end 88 thereof. Seal 84 extends radially outwards in a direction 102 extending from inner end 38 of tubular body 36 of pipe thread protector 32 towards outer end 40 of the tubular body of the pipe thread protector. As seen in FIG. 8, distal sleeve portion 93 of the seal has an inner diameter $D_S$.

Figure 11:
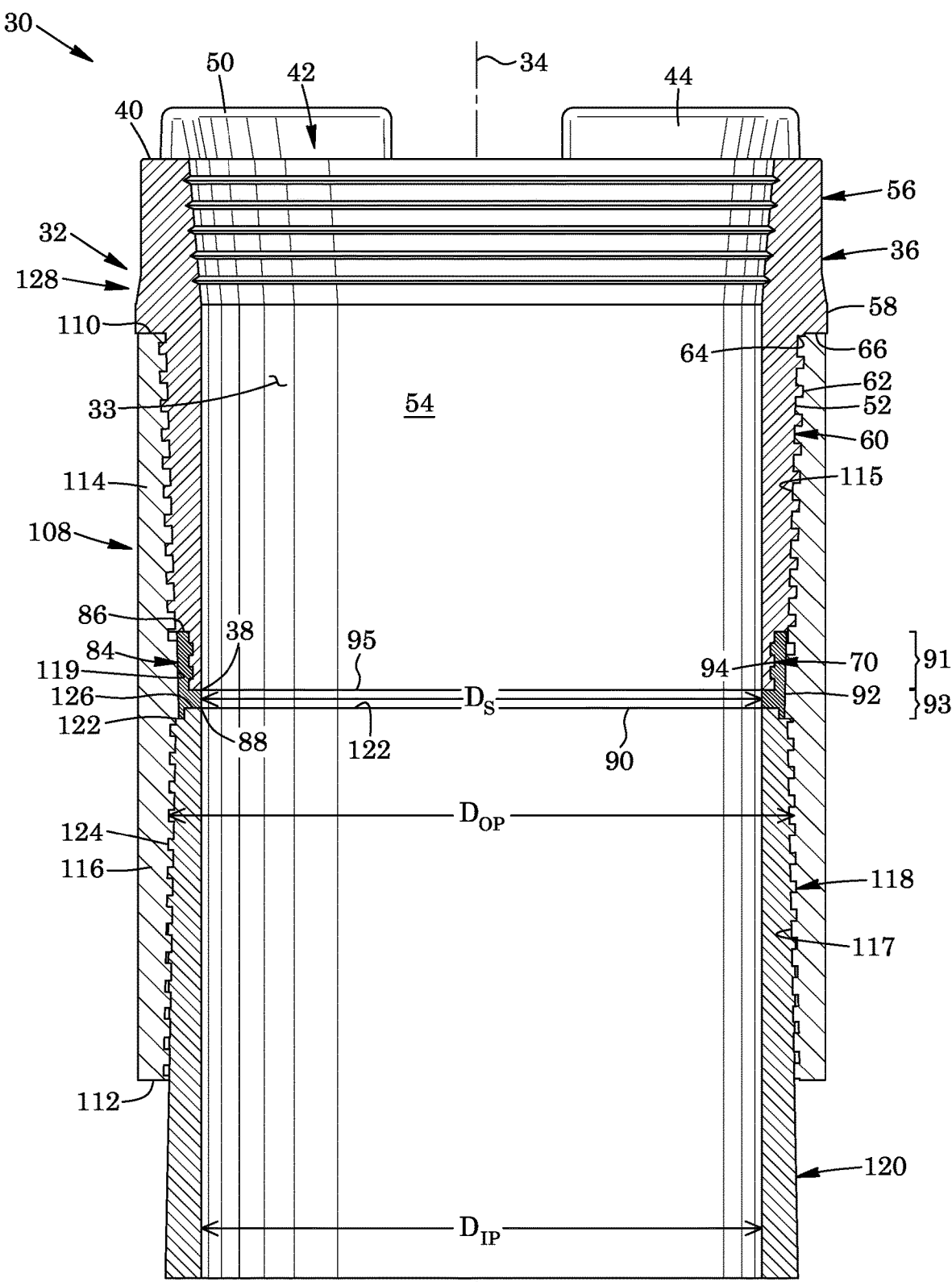
FIG. 11 is a sectional view taken along lines 11-11 of the pipe thread protector assembly and end portion of the pipe of FIG. 9, with the pipe being shown in fragment.

As seen in FIG. 11, pipe thread protector assembly 30 further includes a conduit coupling, in this example a pipe coupling 108. The pipe coupling may be referred to as a coupling and is tubular and sleeve-like in shape in this example. Pipe coupling 108 has a first or outer end 110 and a second or inner end 112 longitudinally spaced-apart from the outer end thereof. The pipe coupling includes a first female member 114 and a second female member 116 coupled thereto. The first female member is integrally interconnected with the second female member so as to form a unitary whole in this example. First female member 114 has inner threading 115 that extends from outer end 110 of pipe coupling 108 towards inner end 112 of the pipe coupling. Second female member 116 has inner threading 117 extends from the inner end of the pipe coupling towards the outer end of the pipe coupling. Pipe coupling 108 has an inner surface, in this example an annular inner surface 119 extending between the first female member thereof and the second female member thereof.

Figure 12:
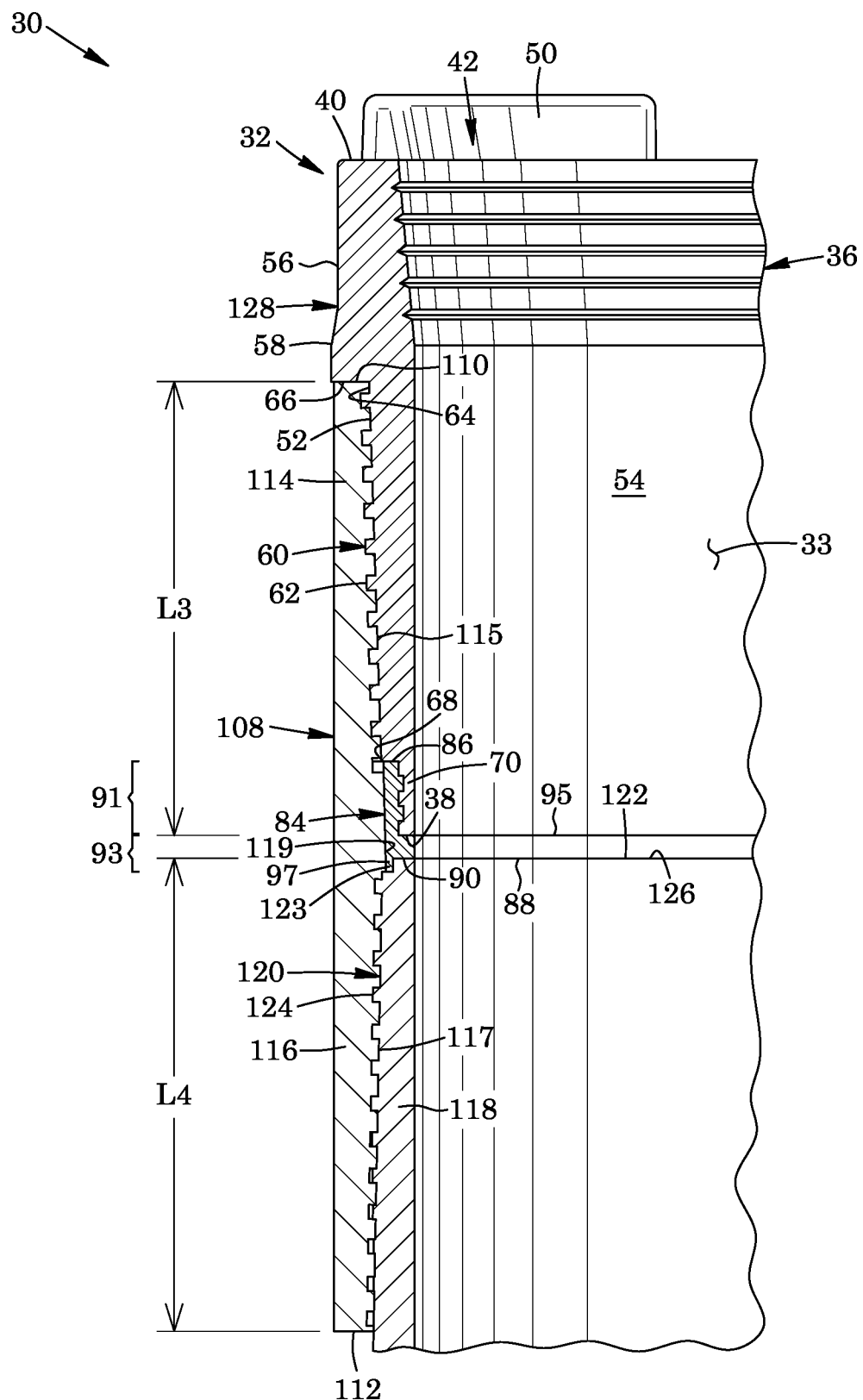
FIG. 12 is an enlarged sectional view of the pipe thread protector assembly and end portion of the pipe of FIG. 11, with the pipe thread protector, the coupling and the pipe being shown in fragment.

First female member 114 of the pipe coupling is shaped to receive seal 84 and end portion 70 and threaded portion 60 of tubular body 36 of pipe thread protector 32. The first female member is shaped to threadably couple with the threaded portion of the tubular body of the pipe thread protector. Outer end 110 of pipe coupling 108 is configured to extend along and abut shoulder 66 of tubular body 36 of pipe thread protector 32 when the pipe coupling and pipe thread protector are so threadably coupled together. Distal sleeve portion 93 and distal end 88 of seal 84 are positioned adjacent second female member 116 of the pipe coupling when the pipe coupling and tubular body 36 of pipe thread protector 32 are so threadably coupled together. As seen in FIG. 12, the extent or depth to which tubular body 36 of pipe thread protector 32 extends within and couples to first female member 114 of pipe coupling 108 is denoted by length L3.

Still referring to FIG. 12, second female member 116 of pipe coupling 108 is shaped to receive and threadably couple with a male threaded end portion 118 of a conduit, in this example pipe 120. The extent or depth to which the pipe extends within and couples to the second female member of the pipe coupling is denoted by length L4. This length may vary depending on the torque applied to pipe coupling 108 and/or pipe 120, as well as the tolerance of the pipe. A pipe with a male threaded end portion 118 that is slightly smaller in outer diameter $D_{OP}$ (seen in FIG. 11) may screw into pipe coupling 108 further and to a greater extent, thus rendering length L4 (seen in FIG. 12) longer, compared to a pipe with a male threaded end portion that is slightly larger in outer diameter, for example.

Referring to FIG. 12, pipe 120 has a first end 122, a second end (not shown) longitudinally spaced-apart from the first end thereof, and threading 124 that extends from the first end thereof towards the second end thereof. The pipe has an outer end face or surface 126 aligned with and extending along end 122 of the pipe. The end surface is planar and may be referred to as a pipe face. In this example pipe coupling 108 and pipe 120 so coupled together form an annular recess 123.

Distal sleeve portion 93 of seal 84 is shaped to extend between tubular body 36 of pipe thread protector 32 and pipe 120 when the pipe coupling and pipe are so threadably coupled together. The seal extends outwards to abut inner surface 119 of the pipe coupling when the pipe thread protector and the pipe are threadably coupled together via the pipe coupling. Seal 84 so shaped and configured functions to inhibit water, debris and the like otherwise passing through exterior 128 and outer surface 52 of pipe thread protector 32 from reaching threading 124 of pipe 120.

Still referring to FIG. 12, the seal is shaped and configured to extend in part into annular recess in this example via outer peripheral edge portion 97 thereof as pipe coupling 108 and pipe 120 are threadably coupled together. Seal 84 so shaped may accommodate variations in the extent to which the pipe threadably couples to the pipe coupling without extending radially inwards. The seal is shaped to inhibit inward bulging thereof when pipe thread protector 32 and pipe 120 are threadably coupled together via pipe coupling 108.

Seal 84, including slanted end surface 90 thereof, so shaped and as herein described is configured to protect and extend along end surface 126 of the pipe when the pipe coupling threadably couples together pipe thread protector 32 and end portion 118 of the pipe. The seal as herein described may function to seal against the pipe face of a male connection throughout a make-up tolerance range. The make-up tolerance is the allowable distance range that end portion 118 or male connection of pipe 120 can travel into female member 116 or female connection. End surface 90 of seal 84 is shaped to inhibit water and debris from contacting end surface 126 of the pipe, in this example by being coextensive with and/or greater in lateral cross-sectional area compared to that of the end surface of the pipe.

Referring to FIG. 11, seal 84 as herein described thus functions to protect the threaded joint of pipe 120 while also accommodating variations in outer diameter pop of end portion 118 of the pipe. Referring to FIG. 12, the seal functions to protect end surface 126 and threading 124 of the pipe, along with threading 115 and 117 of pipe coupling 108, from debris and/or being damaged. Seal 84 as herein described may thus function to protect both male and female threads from dust and water infiltration during transportation and storage.

The seal may further provide added friction to inhibit inadvertent removal of pipe thread protector 32 from pipe coupling 108. Seal 84 thus inhibits the pipe thread protector from coming loose and loosing its seal.

As seen in FIG. 11, pipe thread protector assembly 30 may be used to facilitate receiving a plug (not shown) therein for selectively measuring the inner diameter Dip of pipe 120 without needing to first remove the pipe thread protector assembly. Inner diameter $D_S$ of distal sleeve portion 93 of seal 84 is generally equal to the inner diameter of the pipe and is not more than $\frac{1}{8}^{th}$ smaller the inner diameter of the pipe in one example.

Figure 13:
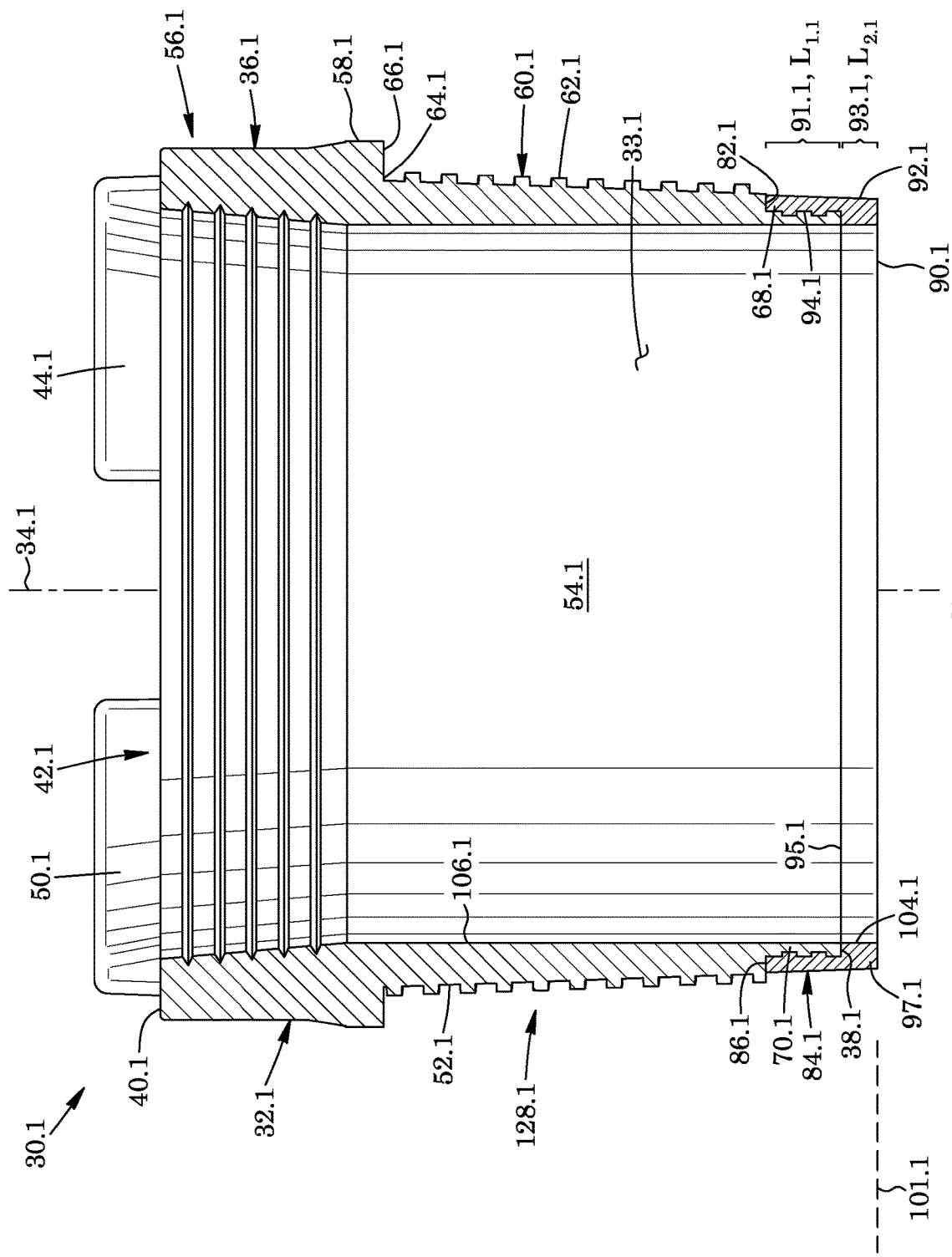
FIG. 13 is a sectional view similar to FIG. 8 of a pipe thread protector according to another aspect.

FIG. 13 shows a pipe thread protector 32.1 for a pipe thread protector assembly 30.1 according to another aspect. Like parts have like numbers and functions as pipe thread protector 32 and pipe thread protector assembly 30 shown in FIGS. 1 to 12 with the addition of decimal extension "0.1". Pipe thread protector 32.1 is substantially the same as pipe thread protector 32 shown in FIGS. 1 to 12 with the following exceptions.

Seal 84.1 has an end surface 90.1 that is planar, non-slanted and which extends parallel to lateral axis 101.1. The end surface of the seal extends perpendicular to longitudinal axis 34.1 of tubular body 36.1 of pipe thread protector 32.1 in this example.

Figure 14:
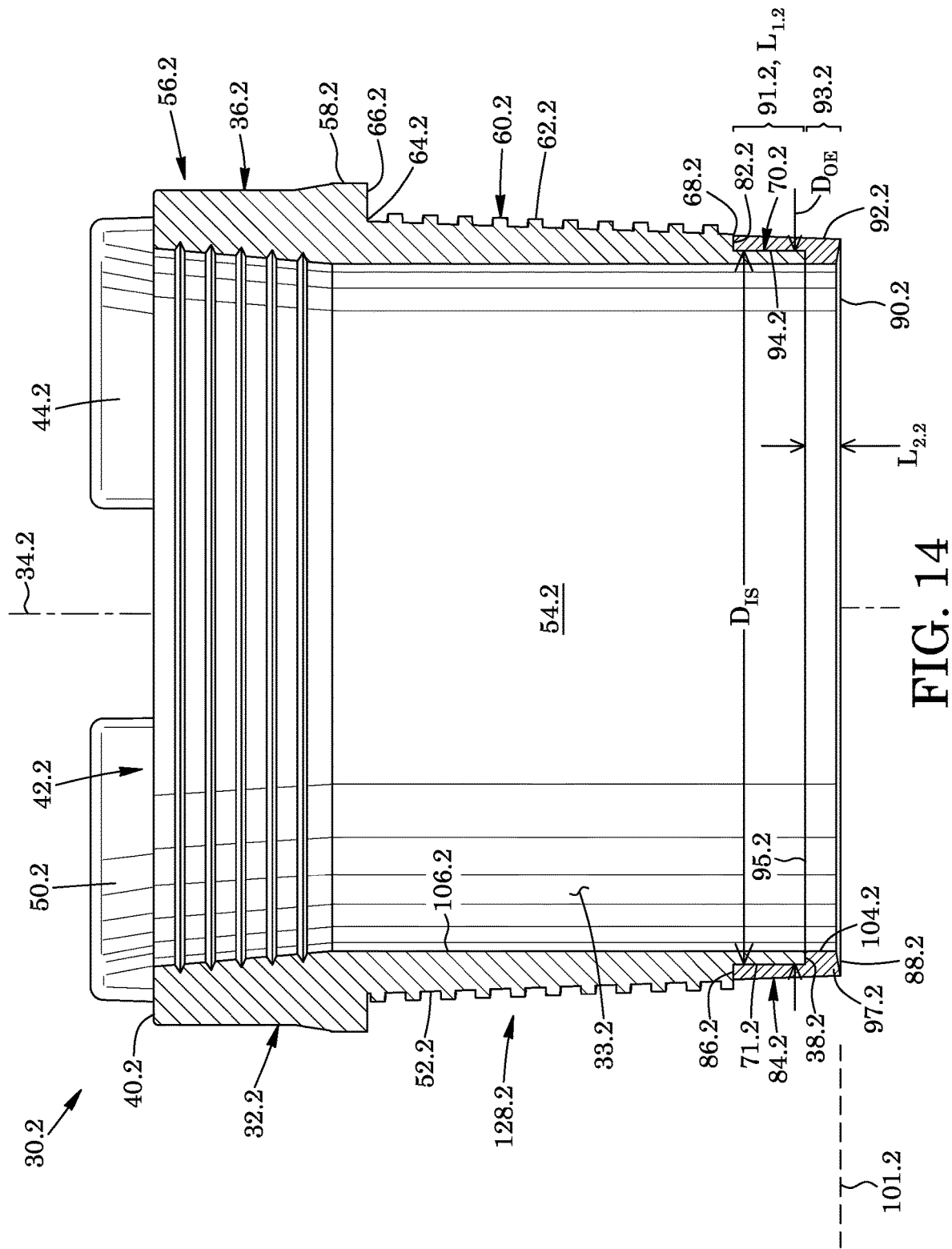
FIG. 14 is a sectional view similar to FIG. 13 of a pipe thread protector according to a further aspect.

FIG. 14 shows a pipe thread protector 32.2 for a pipe thread protector assembly 30.2 according to a further aspect. Like parts have like numbers and functions as pipe thread protector 32 and pipe thread protector assembly 30 shown in FIGS. 1 to 12 with the addition of decimal extension "0.2". Pipe thread protector 32.2 is substantially the same as pipe thread protector 32 shown in FIGS. 1 to 12 with the following exceptions.

Inner surface 94.2 of seal 84.2 is substantially smooth with no tongues and grooves thereon or extending therefrom. Exterior surface 71.2 of end portion 70.2 of tubular body 36.2 of pipe thread protector 32.2 is substantially smooth with no tongues or grooves thereon or extending therefrom. Proximal sleeve portion 91.2 of seal 84.2 is resilient and slightly smaller in interior span or inner diameter Dis compared to the exterior span or outer diameter $D_{OE}$ of the end portion of the tubular body of the pipe thread protector. The proximal sleeve portion of the seal couples to end portion 70.2 of tubular body 36.2 of pipe thread protector 32.2 via an interference fit in this embodiment.

Figure 15:
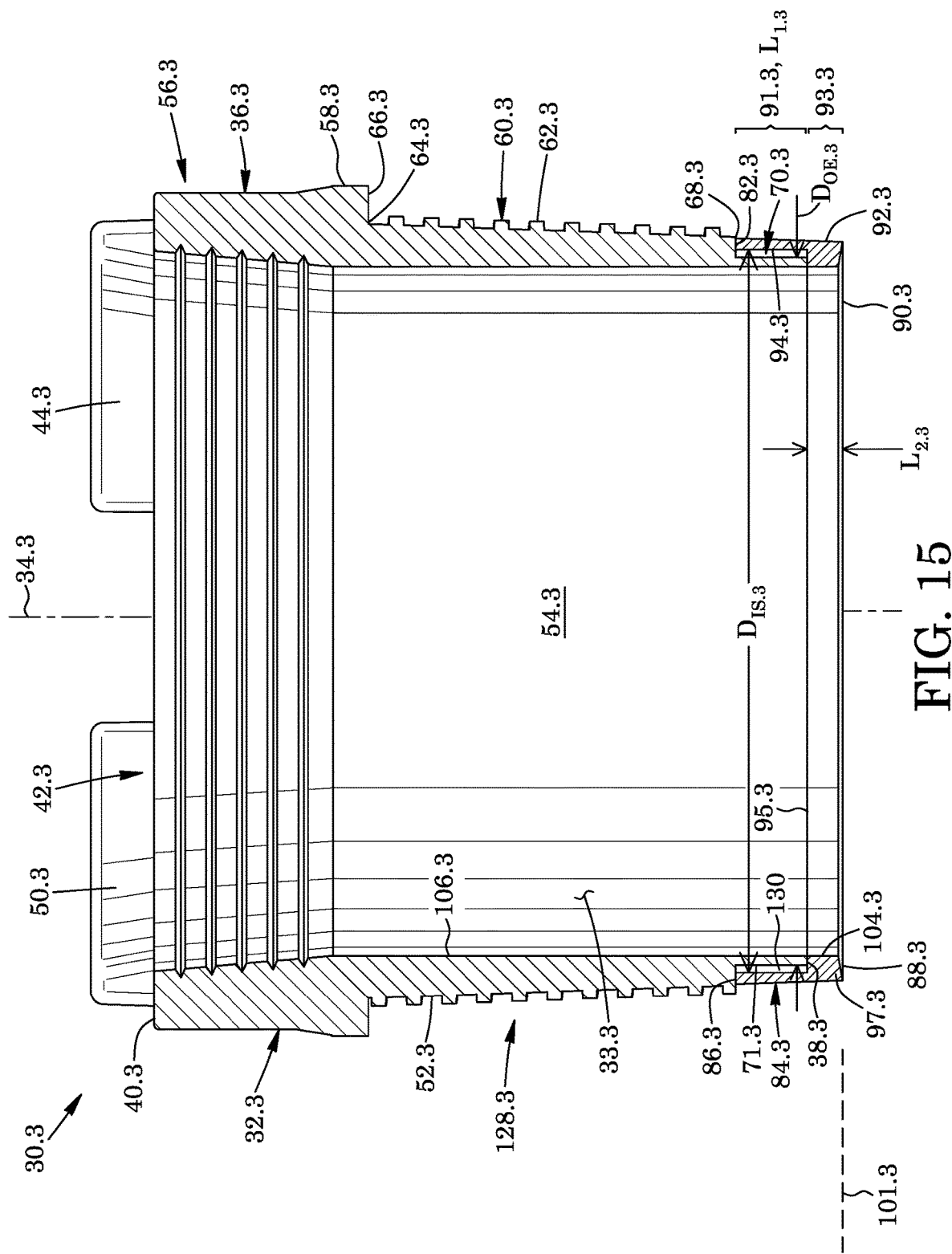
FIG. 15 is a sectional view similar to FIG. 8 of a pipe thread protector according to an additional aspect.

FIG. 15 shows a pipe thread protector 32.3 for a pipe thread protector assembly 30.3 according to an additional aspect. Like parts have like numbers and functions as pipe thread protector 32.2 and pipe thread protector assembly 30.2 shown in FIG. 14 with decimal extension "0.3" replacing decimal extension "0.2" and being added for parts not previously having a decimal extension. Pipe thread protector 32.3 is substantially the same as pipe thread protector 32 shown in FIG. 14 with the following exceptions.

Pipe thread protector 32.3 includes an adhesive 130. The adhesive is positioned between and extends at least in part along exterior surface 71.3 of end portion 70.3 of tubular body 36.3 of the pipe thread protector and inner surface 94.3 of seal 84.3. The seal couples to the end portion of the tubular body of pipe thread protector 32.2 via adhesive 130. The adhesive extends circumferentially about exterior surface 71.3 of end portion 70.3 of tubular body 36.3 of pipe thread protector 32.3 in this example.

Where a component (e.g. an assembly, device, member, etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Interpretation of Terms

Unless the context clearly requires otherwise, throughout the description and the claims:
  "comprise", "comprising", and the like are to be construed in an inclusive sense, as opposed to an exclusive or exhaustive sense; that is to say, in the sense of "including, but not limited to";
  "connected", "coupled", or any variant thereof, means any connection or coupling, either direct or indirect, between two or more elements; the coupling or connection between the elements can be physical, logical, or a combination thereof;
  "herein", "above", "below", and words of similar import, when used to describe this specification, shall refer to this specification as a whole, and not to any particular portions of this specification;
  "or", in reference to a list of two or more items, covers all of the following interpretations of the word: any of the items in the list, all of the items in the list, and any combination of the items in the list;
  the singular forms "a", "an", and "the" also include the meaning of any appropriate plural forms. These terms ("a", "an", and "the") mean one or more unless stated otherwise;
  "and/or" is used to indicate one or both stated cases may occur, for example A and/or B includes both (A and B) and (A or B);
  "approximately" when applied to a numerical value means the numerical value±10%;
  where a feature is described as being "optional" or "optionally" present or described as being present "in some embodiments" it is intended that the present disclosure encompasses embodiments where that feature is present and other embodiments where that feature is not necessarily present and other embodiments where that feature is excluded. Further, where any combination of features is described in this application this statement is intended to serve as antecedent basis for the use of exclusive terminology such as "solely," "only" and the like in relation to the combination of features as well as the use of "negative" limitation(s)" to exclude the presence of other features; and
  "first" and "second" are used for descriptive purposes and cannot be understood as indicating or implying relative importance or indicating the number of indicated technical features.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a range for a value is stated, the stated range includes all sub-ranges of the range. It is intended that the statement of a range supports the value being at an endpoint of the range as well as at any intervening value to the tenth of the unit of the lower limit of the range, as well as any subrange or sets of sub ranges of the range unless the context clearly dictates otherwise or any portion(s) of the stated range is specifically excluded. Where the stated range includes one or both endpoints of the range, ranges excluding either or both of those included endpoints are also included in the invention.

Certain numerical values described herein are preceded by "about". In this context, "about" provides literal support for the exact numerical value that it precedes, the exact numerical value ±5%, as well as all other numerical values that are near to or approximately equal to that numerical value. Unless otherwise indicated a particular numerical value is included in "about" a specifically recited numerical value where the particular numerical value provides the substantial equivalent of the specifically recited numerical value in the context in which the specifically recited numerical value is presented. For example, a statement that something has the numerical value of "about 10" is to be interpreted as: the set of statements:
  in some embodiments the numerical value is 10;
  in some embodiments the numerical value is in the range of 9.5 to 10.5;
and if from the context the person of ordinary skill in the art would understand that values within a certain range are substantially equivalent to 10 because the values with the range would be understood to provide substantially the same result as the value 10 then "about 10" also includes:
  in some embodiments the numerical value is in the range of C to D where C and D are respectively lower and upper endpoints of the range that encompasses all of those values that provide a substantial equivalent to the value 10

Specific examples of systems, methods and apparatus have been described herein for purposes of illustration.

These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

As will be apparent to those of skill in the art upon reading this disclosure, each of the individual embodiments described and illustrated herein has discrete components and features which may be readily separated from or combined with the features of any other described embodiment(s) without departing from the scope of the present invention.

Any aspects described above in reference to apparatus may also apply to methods and vice versa.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible). This is the case even if features A and B are illustrated in different drawings and/or mentioned in different paragraphs, sections or sentences.

ADDITIONAL DESCRIPTION

Examples of pipe thread protector assemblies have been described. The following clauses are offered as further description.

(1) A pipe thread protector comprising: a tubular body having an open first end, an open second end spaced-apart from the first end thereof, and a bore extending from the first end thereof to the second end thereof; and threading extending between the first end of the tubular body and the second end of the tubular body.

(2) A pipe thread protector according to clause 1, the pipe thread protector including one or more protrusions coupled to and extending axially outwards from the second end of the tubular body.

(3) A pipe thread protector according to any one of clauses 1 to 2 wherein the threading couples to and extends along an outer surface of the tubular body.

(4) A pipe thread protector according to any one of clauses 1 to 3, the pipe thread protector including a seal coupled to the first end of the tubular body.

(5) A pipe thread protector according to clause 4 wherein the seal extends radially outwards in a direction extending from the first end of the tubular body towards the second end of the tubular body.

(6) A pipe thread protector according to any one of clauses 4 to 5 wherein the seal tapers in a direction extending from the second end of the tubular body towards the first end of the tubular body.

(7) A pipe thread protector according to any one of clauses 4 to 6 wherein the seal tapers in a direction extending from an outer surface thereof to an inner surface thereof.

(8) A pipe thread protector according to any one of clauses 4 to 6 wherein the seal has an inner surface, an outer surface spaced-apart from the inner surface thereof, and an end surface which extends from the outer surface thereof to the inner surface thereof in a direction extending in part from the first end of the tubular body towards the second end of the tubular body.

(9) A pipe thread protector according to any one of clauses 4 to 8 wherein the inner surface of the seal at least in part aligns with and extends parallel to the inner surface of the tubular body.

(10) A pipe thread protector according to any one of clauses 4 to 9 wherein the outer surface of the seal aligns with and extends parallel to the outer surface of the tubular body.

(11) A pipe thread protector according to any one of clauses 4 to 10 wherein the seal couples to the tubular body via one or more tongues and grooves.

(12) A pipe thread protector according to any one of clauses 4 to 10 wherein the seal couples to the tubular body via an interference fit.

(13) A pipe thread protector according to any one of clauses 4 to 10 wherein the seal couples to the tubular body via adhesive.

(14) A pipe thread protector seal, the seal being tubular, the seal tapering in a direction extending from a proximal end thereof towards a distal end thereof, and the seal tapering in a direction extending from an outer surface thereof to an inner surface thereof.

(15) A pipe thread protector seal, the seal being tubular, the seal being L-shaped in longitudinal cross-section and the seal tapering in a direction extending from an outer surface thereof to an inner surface thereof.

(16) A seal according to any one of clauses 4 to 15, the seal including an outer peripheral portion that is annular and triangular in longitudinal cross-section.

(17) A pipe thread protector assembly comprising: a pipe thread protector; a coupling via which the pipe thread protector and a male threaded end of a pipe and threadably couple together; and a seal coupled to an inner end of the pipe thread protector and shaped to protect and extend along an outer end surface of the pipe.

(18) A pipe thread protector assembly according to clause 17 wherein the coupling and the pipe so coupled together form an annular recess and wherein the seal is shaped to extend in part into said annular recess.

(19) A pipe thread protector assembly according to any one of clauses 17 to 18 wherein the seal is shaped to extend outwards to abut the coupling when the pipe thread protector and the pipe are threadably coupled together via the coupling.

(20) A pipe thread protector assembly according to any one of clauses 17 to 19 wherein the seal is shaped to accommodate variations in the extent to which the pipe threadably couples to the coupling without extending radially inwards.

(21) A pipe thread protector assembly according to any one of clauses 17 to 20 wherein the seal is shaped to inhibit inward bulging thereof when the pipe thread protector and the pipe are threadably coupled together via the coupling.

(22) An apparatus including any new and inventive feature, combination of features, or sub-combination of features as described herein.

(23) A pipe thread protector including any new and inventive feature, combination of features, or sub-combination of features as described herein.

(24) A pipe thread protector seal including any new and inventive feature, combination of features, or sub-combination of features as described herein.

(25) A pipe thread protector assembly including any new and inventive feature, combination of features, or sub-combination of features as described herein.

(26) Methods including any new and inventive steps, acts, combination of steps and/or acts or sub-combination of steps and/or acts as described herein.

It will be appreciated that many variations are possible within the scope of the invention described herein. The pipe thread protector 32 and coupling 108 may be referred to collectively as the box end. In addition or alternatively, the pipe thread protector and coupling may be integrally interconnected so as to form a unitary whole.

It is intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A pipe thread protector comprising:
a tubular body having an open first end, an open second end spaced-apart from the first end thereof, an inner surface extending from the first end thereof to the second end thereof, and a bore extending from the first end thereof to the second end thereof;
threading extending between the first end of the tubular body and the second end of the tubular body; and
a seal coupled to the first end of the tubular body and shaped to protect and extend along an outer end surface of a pipe, wherein the seal has an inner surface which aligns with and extends parallel to the inner surface of the tubular body.

2. A seal for a pipe thread protector as claimed in claim 1, the seal being tubular, tapering at least in part in a direction extending from an outer surface thereof to the inner surface thereof, and tapering in a direction extending from a proximal end thereof towards a distal end thereof.

3. A tubular body for a pipe thread protector, the tubular body being as claimed in claim 1.

4. A pipe thread protector comprising:
a tubular body having an open first end, an open second end spaced-apart from the first end thereof, and a bore extending from the first end thereof to the second end thereof;
threading extending between the first end of the tubular body and the second end of the tubular body; and
a seal coupled to the first end of the tubular body and shaped to protect and extend along an outer end surface of a pipe, wherein the seal has an inner diameter equal to or less than an inner diameter of the pipe.

5. A pipe thread protector according to claim 4, wherein the inner diameter of the seal is not more than $\frac{1}{8}^{th}$ smaller than the inner diameter of the pipe.

6. A pipe thread protector according to claim 4, including one or more protrusions coupling to and extending axially outwards from the second end of the tubular body.

7. A pipe thread protector according to claim 4, wherein the threading couples to and extends along an outer surface of the tubular body.

8. A pipe thread protector assembly comprising:
a pipe thread protector;
a coupling, wherein the pipe thread protector is coupled to a male threaded end of a pipe via the coupling; and
a seal coupling to an inner end of the pipe thread protector and shaped to protect an outer end surface of the pipe, wherein the seal functions to abut against the outer end surface of the pipe throughout a make-up tolerance range, where the make-up tolerance is an allowable distance range within which a male threaded end portion of the pipe travels into the coupling.

9. A pipe thread protector according to claim 8, wherein the seal extends radially outwards in a direction extending from the first end of the tubular body towards the second end of the tubular body.

10. A pipe thread protector according to claim 8, wherein the seal tapers in a direction extending from an outer surface thereof to the inner surface thereof.

11. A pipe thread protector according to claim 8, wherein the seal has an inner surface, an outer surface radially spaced-apart from the inner surface thereof, and an end surface which extends between and is slanted from the outer surface thereof to the inner surface thereof.

12. A pipe thread protector according to claim 8, wherein the tubular body has an outer surface between the first end thereof and the second end thereof and wherein the seal has an outer surface which aligns with and extends parallel to the outer surface of the tubular body.

13. A seal for a pipe thread protector of claim 8, the seal including a proximal sleeve portion connectable with one of the ends of the tubular body of the pipe thread protector, and the seal including a distal sleeve portion coupled to and extending radially inwards from the proximal sleeve portion thereof, the distal sleeve portion of the seal being an irregular quadrilateral in cross-section.

14. A pipe thread protector according to claim 8, wherein the seal couples to the tubular body via one or more tongues and grooves.

15. A pipe thread protector according to claim 8, wherein the seal couples to the tubular body via an interference fit.

16. A pipe thread protector assembly according to claim 8, wherein the seal has an end surface which is larger than the outer end surface of the pipe.

17. A pipe thread protector assembly according to claim 8, wherein the seal has an end surface that is at least coextensive with the outer end surface of the pipe when the seal and the pipe are coupled together.

18. A pipe thread protector assembly comprising:
a pipe thread protector;
a coupling, wherein the pipe thread protector is coupled to a male threaded end of a pipe via the coupling and wherein the coupling and the pipe so coupled together form an annular recess; and
a seal coupling to an inner end of the pipe thread protector and shaped to protect an outer end surface of the pipe, wherein the seal is shaped to extend in part into said annular recess.

19. A pipe thread protector assembly comprising:
a pipe thread protector;
a coupling, wherein the pipe thread protector is coupled to a male threaded end of a pipe via the coupling; and
a seal coupling to an inner end of the pipe thread protector and shaped to protect an outer end surface of the pipe, wherein the seal is shaped to extend outwards to abut the coupling when the pipe thread protector and the pipe are coupled together via the coupling.

20. A pipe thread protector assembly comprising:
a pipe thread protector;
a coupling, wherein the pipe thread protector is coupled to a male threaded end of a pipe via the coupling; and
a seal coupling to an inner end of the pipe thread protector and shaped to protect an outer end surface of the pipe, wherein the seal is shaped to accommodate variations in the extent to which the pipe threadably couples to the coupling without extending radially inwards.

* * * * *